United States Patent
Fujii et al.

(10) Patent No.: US 6,477,179 B1
(45) Date of Patent: Nov. 5, 2002

(54) DATA RECEIVING DEVICE AND DATA RECEIVING METHOD

(75) Inventors: Noboru Fujii, Miyagi (JP); Ichiro Kubota, Kanagawa (JP); Yasuaki Yamagishi, Kanagawa (JP); Kazuhiro Hara, Tokyo (JP); Akihiro Uetake, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/072,288

(22) Filed: May 4, 1998

(30) Foreign Application Priority Data

May 9, 1997 (JP) .............................................. 9-119996

(51) Int. Cl.$^7$ ................................................ H04N 7/14
(52) U.S. Cl. ....................... 370/466; 370/487; 725/109; 725/153
(58) Field of Search .................. 370/352, 353, 370/354, 486, 487, 389, 465, 466, 485; 725/68, 70, 139, 141, 151, 153, 106, 109, 110

(56) References Cited

U.S. PATENT DOCUMENTS

| | | | |
|---|---|---|---|
| 5,019,910 A | * | 5/1991 | Filmer .......................... 725/68 |
| 5,347,304 A | | 9/1994 | Moura et al. |
| 5,608,446 A | | 3/1997 | Carr et al. |
| 5,757,416 A | * | 5/1998 | Birch et al. .................. 725/144 |
| 5,864,747 A | * | 1/1999 | Clark et al. .................... 725/67 |
| 5,987,518 A | * | 11/1999 | Gotwald ....................... 709/230 |
| 6,037,932 A | * | 3/2000 | Feinleib ....................... 345/327 |
| 6,101,180 A | * | 8/2000 | Donahue et al. ............. 370/352 |
| 6,134,419 A | * | 10/2000 | Williams ...................... 725/151 |

FOREIGN PATENT DOCUMENTS

EP          0 854 599          7/1998

OTHER PUBLICATIONS

Skritek P: "Aufbruch Zum Radio–Und TV Highway" Elektrotechnik Und Informationstechnik,AT,Springer Verlag, Wien, vol. 113, No. 1, 1996, pp. 31–34, XP000554448.

* cited by examiner

Primary Examiner—Min Jung
(74) Attorney, Agent, or Firm—Frommer Lawrence & Haug LLP; William S. Frommer; Glenn F. Savit (57) ABSTRACT

Data receiving device and method in which data is received through a broadcast network, the data is reconstructed into packets usable on a computer, and the packets are output to the computer, directly or through a local area network. The reconstructed packets are preferably in the format of Internet Protocol (IP) packets. A destination address allocated to the data receiving device on the broadcast network is converted, via the data receiving device, to an IP address allocated to a personal computer on the Internet.

7 Claims, 8 Drawing Sheets

DATA RECEIVING DEVICE AND DATA RECEIVING METHOD

BACKGROUND OF THE INVENTION

1. Field of the Invention

This invention relates to a data receiving device and a data receiving method for outputting digital data received through, for example, a digital satellite broadcast network, to a computer.

2. Description of the Related Art

A receiving device capable of receiving only broadcast streams of audio data and video data and outputting audio/video streams from an external interface is generally used, such as a receiving device for cable television broadcast or satellite broadcast.

Some of such receiving devices have a function to receive digital data which is to be utilized on a computer, in addition to the video/audio streams, and may output the data streams to the computer from an output port. However, no such receiving devices have a function to output the received broadcast data as an IP (Internet Protocol) data gram.

In order to utilize the data received through a broadcast network on a computer, it is necessary to mount a dedicated circuit board on each computer. Therefore, the receiving device is lacking in versatility and is not necessarily easy to handle.

SUMMARY OF THE INVENTION

In view of the foregoing status of the art, it is an object of the present invention to provide a data receiving device and a data receiving method which enable conversion of digital data transmitted through a broadcast network into an IP data gram and output of the IP data gram to a computer or the like.

According to the present invention, there is provided a data receiving device for receiving broadcast data including digital data and outputting the broadcast data to a computer. The data receiving device includes a first interface to which the broadcast data is inputted, a packetizer for reconstructing the inputted broadcast data into a predetermined packet, and a second interface for outputting the reconstructed packet to the computer.

According to the present invention, there is also provided a data receiving method for receiving broadcast data including digital data and outputting the broadcast data to a computer. The data receiving method includes a packetizing step of reconstructing inputted broadcast data into a predetermined protocol packet, and a routing step of rewriting header information and controlling a route of response data with respect to the protocol packet, in outputting the reconstructed predetermined packet to the computer.

According to the present invention, a data receiving device and a data receiving method for converting data transmitted through a broadcast network into IP data and outputting the IP data to a computer may be provided.

DETAILED DESCRIPTION OF THE INVENTION

Preferred embodiments of the present invention will now be described in detail with reference to the drawings.

Figure 1:
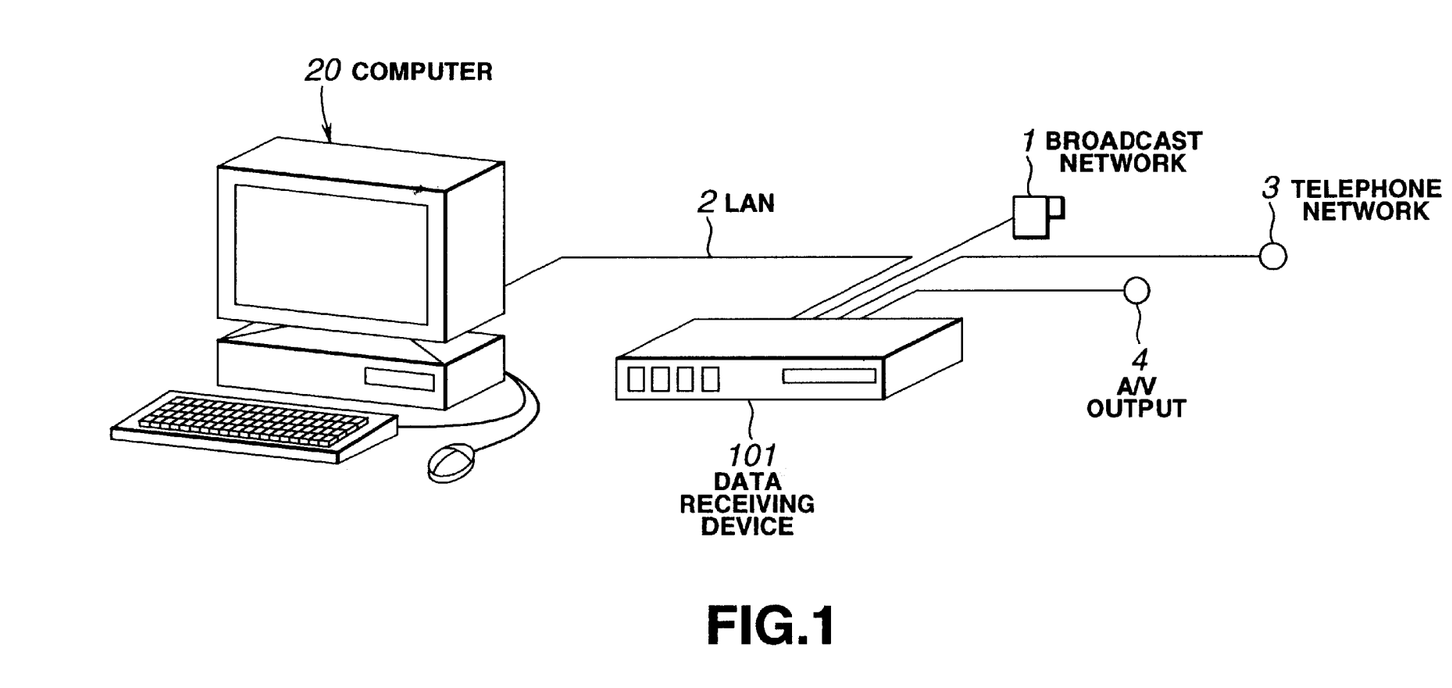
FIG. 1 is a view showing an embodiment of a data receiving device according to the present invention.

FIG. 1 shows an embodiment of a data receiving device of the present invention.

This data receiving device has a function to receive digital data which is utilized on a computer, in addition to the functions of an ordinary broadcast receiving device for receiving video data and audio data streams and outputting the received data streams. This data receiving device also has an external output interface for outputting digital data streams of received video data and audio data.

Specifically, a data receiving device 101 according to the present invention has a broadcast interface 1a for connection to a broadcast network through a coaxial cable or the like, a PC interface 2a for connection to a personal computer 20 through a LAN (Local Area Network), a telephone interface 3a for connection to an external network such as the Internet through a telephone network, and an AV equipment interface 4a for outputting received A/V (Audio/Video) data.

This data receiving device 101 is characterized in that the above-described interfaces are housed in a single casing to realize a compact structure, unlike a conventional device in which the interfaces are laid out on a circuit board mounted on an extended slot of the computer 20. Therefore, simply by installing the data receiving device 101 between the computer 20 and the broadcast network or the telephone network and connecting a connector, the data transmitted through the broadcast network may be converted to IP data so as to be utilized on the computer 20.

Figure 2:
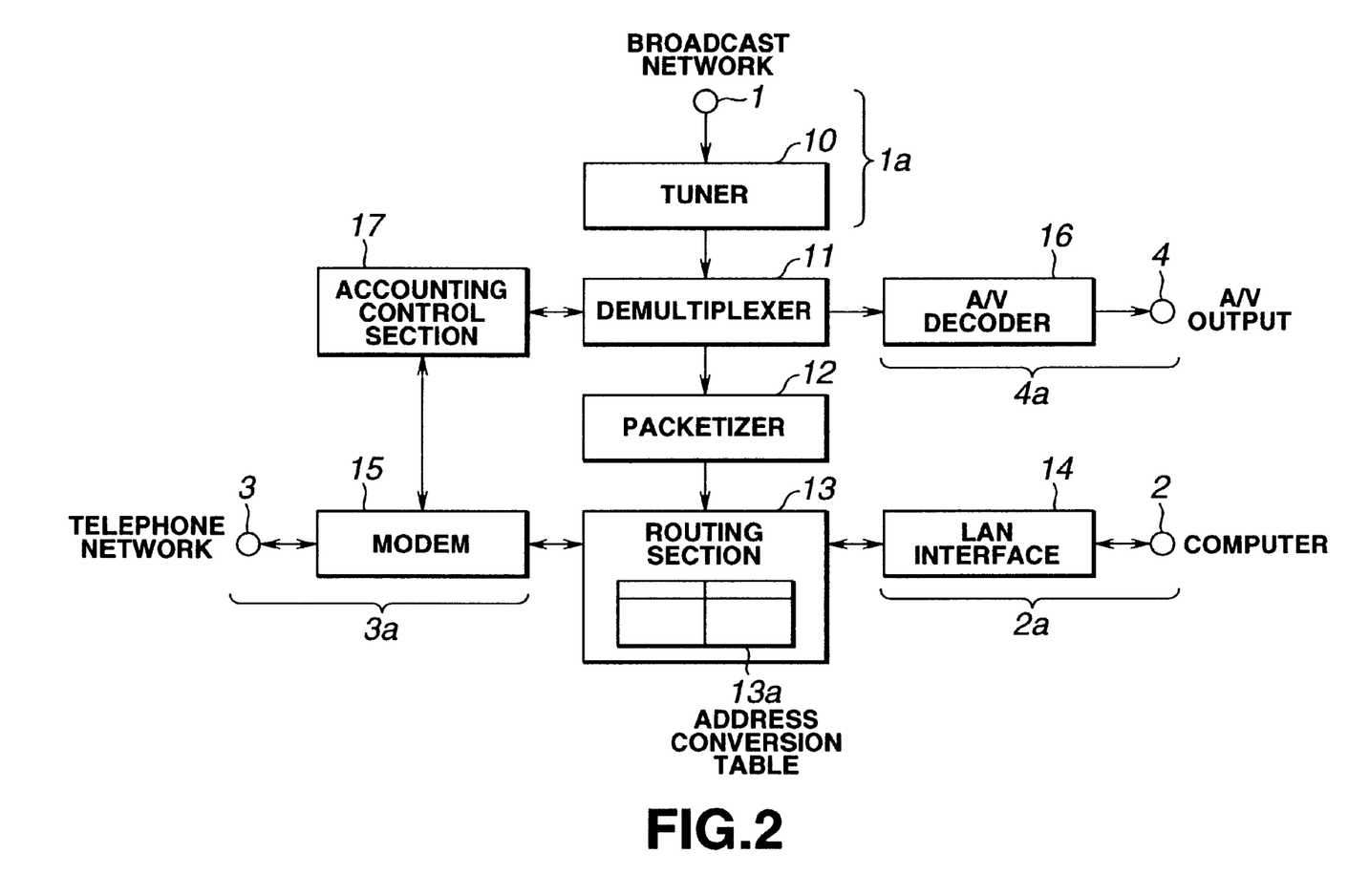
FIG. 2 is a block diagram showing the structure of essential portions of the data receiving device according to the present invention.

FIG. 2 is a block diagram showing the structure of essential portions of the data receiving device of the present invention.

The basic function of this data receiving device is to receive digital data transmitted through a unidirectional circuit of large capacity such as a satellite broadcast network and outputting the received digital data to the computer. Therefore, this data receiving device has the following three interfaces.

The broadcast interface 1a as a first interface is a broadcast interface connected to the broadcast network through a coaxial cable at a terminal 1. The broadcast interface 1a includes a tuner 10 for receiving digital satellite broadcast or cable television broadcast.

The broadcast network to be connected is not limited to the satellite broadcast or cable television broadcast, and may be a broadcast network using ground waves.

The PC interface 2a as a second interface is a computer interface for transmitting/receiving data to/from the personal computer via a terminal 2. Normally, the PC interface 2a includes a LAN interface for connection to the computer through the LAN. The LAN assumed in this case is based on 10BaseT for carrying out base band transmission at a transmission speed of 10 Mbps, or the IEEE 1394 Standard for a High Performance Serial Bus which enables mixed transmission of control signals and information signals at a transfer speed of 100 M/200 M/400 Mbps, as a serial interface standard.

The telephone interface 3a as a third interface is an external connection interface for connection to an external network such as the Internet. As the telephone network, a PSTN (Public Switched Telephone Network) for transmitting analog audio signals in a frequency band of 3.4 kHz, or an ISDN (Integrated Services Digital Network) for transmitting digital data at 64 to 128 kbps is used. These telephone networks are connected to a terminal 3 through a modem or a terminal adaptor of the ISDN.

This data receiving device may include only the broadcast interface 1a and the PC interface 2a, depending on the required functions. Also, an ATM (Asynchronous Transfer Mode) or an FDDI (Fiber Distributed Data Interface) may be used other than the above-described interfaces.

The tuner 10 selects a desired broadcast channel from broadcast data inputted through the terminal 1, and outputs the data stream thereof. This data stream includes digital data to be utilized on the computer as well as audio data and video data.

A demultiplexer 11 collects and classifies packets having the same PID (Packet Identifier) of the packets of data steams selected by the tuner 10. Thus, the audio data, the video data and the digital data as multiplexed broadcast data are separated from one another.

The separated audio data and video data are transmitted to an A/V decoder 16, and the digital data is transmitted to a packetizer 12, as later described.

The A/V decoder 16 is adapted for decoding the video data stream and the audio data stream from the demultiplexer 11 into analog signals. The analog signals are outputted from an A/V output terminal 4.

The data receiving device will be described further in detail with reference to the flow of the digital data separated by the demultiplexer 11.

In the following description, it is assumed that a personal computer connected through the PC interface 2a is connected a service provider of the Internet through the telephone interface 3a. An IP (Internet Protocol) address is allocated to each of the interfaces, and the data stream is an IP data gram.

As described above, the digital data stream separated by the demultiplexer 11 is transmitted to the packetizer 12. This packetizer 12 is adapted for converting the unit or format of a transport stream packet, for example, in conformity to the transmission standard of digital satellite broadcast, and generating a predetermined packet based on the Internet Protocol, for example.

In this case, a TS (Transport Stream) packet from the demultiplexer 11 is reconstructed into an IP (Internet Protocol) packet and transmitted to a routing section 13. The IP packet as a set of data is also referred to as an IP data gram.

The routing section 13 is adapted for selecting a route of data to be handled on the data receiving device, and converting the address of the destination in accordance with the selected route. The routing section 13 selects the route between the broadcast interface 1a, the PC interface 2a and the telephone interface 3a. The control information may be included in the broadcast data inputted through the broadcast interface 1a, or may be included in the data transmitted from the personal computer connected through the PC interface 2a.

A LAN interface 14 is an interface for transmitting/receiving data to/from the personal computer connected through the terminal 2, and is an interface for connection to a LAN.

A modem 15 is an interface for transmitting/receiving data to/from an external network through the telephone network connected to the terminal 3. When the telephone network is an ISDN, a terminal adaptor is used separately.

An accounting control section 17 is adapted for controlling accounting in receiving a chargeable broadcast program. Such control is referred to as CA (Conditional Access) control. The accounting control section 17 is provided, if necessary. This accounting control section 17 has a function to transmit accounting information generated in accordance with the conditions recorded on a memory card, to a broadcasting service provider through the telephone network.

In the above description, the broadcast data inputted to the data receiving device is not scrambled. However, it is normal that actual broadcast data is scrambled. In this case, a descrambler for audio/video data is provided after the tuner 10, and a descrambler for data is provided after the packetizer 12.

The operation of the data receiving device of the present invention having the above-described basic structure will now be described with reference to FIG. 3.

First, transmission and reception of an IP data gram between the personal computer and an external Internet connection provider through the data receiving device will be described.

The IP data gram received through the terminal 2 and the LAN interface 14 constituting the PC interface 2a is transmitted to the routing section 13. When this IP data gram is to be transmitted to the telephone network, the telephone interface 3a is selected and the data is transmitted to the modem 15. The modem 15 calls the Internet connection provider through the telephone network connected to the terminal 3, and transmits the IP data gram to the telephone network from the terminal 3 on completion of connecting operation.

The data transmitted from the Internet connection provider through the telephone network is inputted to the routing section 13 via the modem 15 from the terminal 3. At this point, the PC interface 2a is selected and the received data is outputted to the computer.

As the communication protocol in outputting the IP data gram through the PC interface 2a from the routing section 13, the standard Internet Protocol is used. This data receiving device obtains the IP address allocated in advance to each receiving device (personal computer) in the process of PPP (Point-to-Point Protocol) connection to the Internet connection provider. In addition, after obtaining the IP address, the data receiving device accesses an authentication server on the Internet managed by the digital satellite broadcasting service provider, and obtains the IP address allocated to each receiving device used on the broadcast network. The corresponding relation between the IP address on the Internet and the IP address on the broadcast network is stored in a memory (RAM) as an address conversion table 13a within the routing section 13.

In the following description of data, a bidirectional telephone network is used in transmitting a request to the external network such as the Internet from the computer, and data from the Internet in response to the request is received by using a unidirectional broadcast network of large capacity such as a digital satellite broadcast network or a cable television network.

Figure 3A:
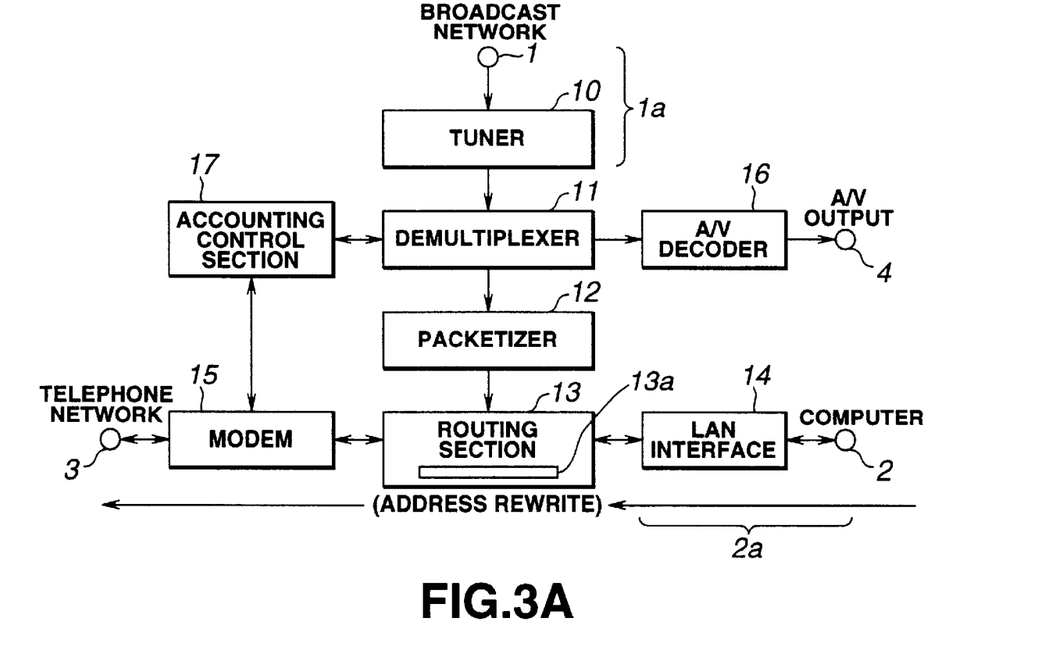
FIGS. 3A and 3B are views for explaining the flow of data in the data receiving device according to the present invention.

As shown in FIG. 3A, the request from the personal computer is transmitted to the routing section 13 through the PC interface 2a. At this point, the routing section 13 rewrites the IP data address of the header portion of the IP data gram to the IP address of the broadcast interface 1a on the basis of the address conversion table 13a. Then, the IP data gram with the rewritten IP address is processed by re-calculation of check sum and then transmitted to the Internet through the telephone network from the modem 15. The rewritten IP address pair is stored on the address conversion table 13a. That is, the address conversion table 13a shows the corresponding relation between the IP address used on the broadcast network and the IP address used normally on the Internet.

Figure 3B:
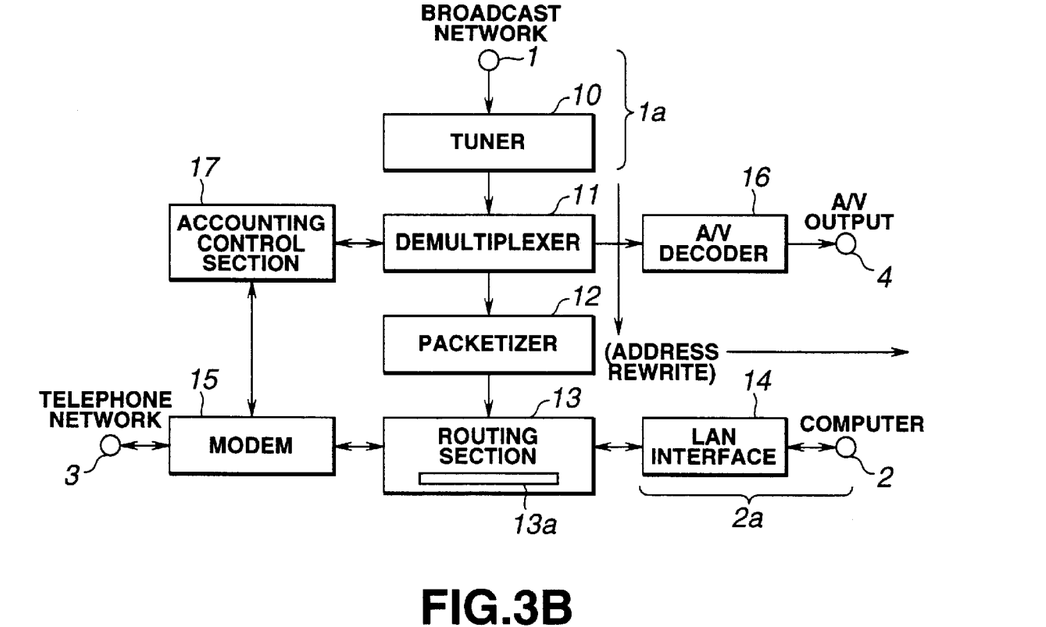

By thus carrying out address conversion, the data transmitted from the server of the Internet is passed through the broadcast network such as the digital satellite broadcast network, and received by the personal computer through the broadcast interface 1a, the demultiplexer 11, the packetizer 12, the routing section 13 and the PC interface 2a of the data receiving device, as shown in FIG. 3B. Specifically, the transport stream packet received by the tuner 10 through the broadcast interface 1a is converted to the IP packet by the packetizer 12 and transmitted to the routing section 13. The IP destination address, allocated on the broadcast network, of the header portion of the IP data gram as a set of IP packets is rewritten to the IP address of the computer that made the request for the corresponding data. Then, the PC interface 2a is selected and the IP data gram is transmitted to the personal computer.

The bidirectional communication using the broadcast interface 1a of the data receiving device may be realized not only by the above-described method using address rewrite, but also by various other methods.

The IP packet will now be described.

Figure 4:
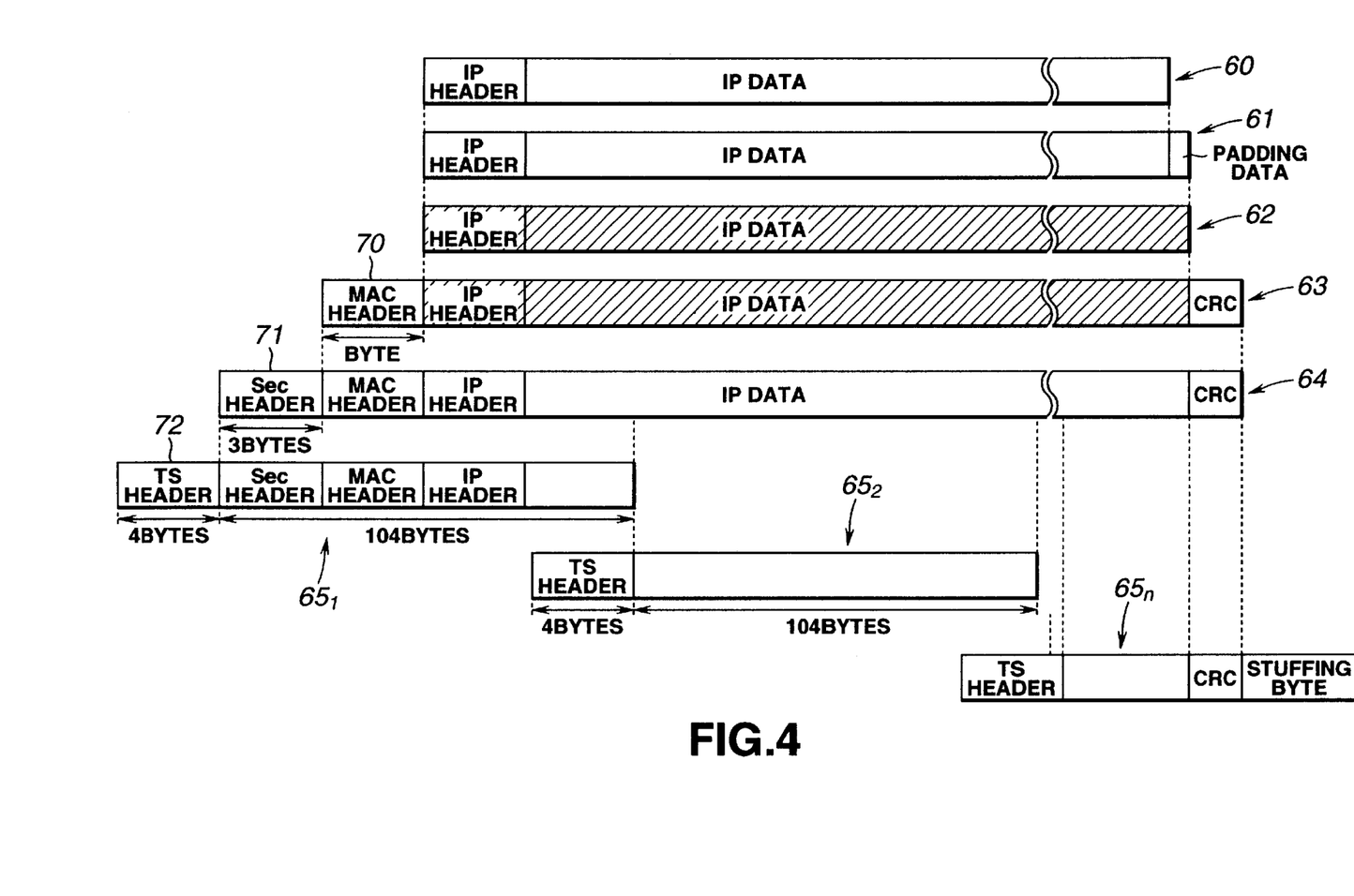
FIG. 4 is a view for explaining the process of producing an IP packet.

FIG. 4 shows the structure of an IP packet.

The size of an IP packet 60 is prescribed by the TCP/IP (Transmission Control Protocol/Internet Protocol). If data requested by a user exceeds the prescribed size, the data is divided into plural IP packets.

In the case where data is to be encrypted, it is normal that encryption is carried out with respect to a plaintext of 64 bits. If the data length of the IP packet 60 to be encrypted is not a multiple of 64 bits, padding of invalid data is carried out to make the entire IP packet 60 a multiple of 64 bits, thus forming an IP packet 61.

To an IP packet 62 formed by encrypting the IP packet 61 for a specified user, a MAC header 70 is appended. This MAC header 70 includes a SSID (Server System ID) of 8 bits, a UDB (User Depend Block) 1 of 24 bits, and a UDB2 of 32 bits. Particularly, in the UDB2 of the MAC header 70, a destination IP address similar to the destination IP address written in the IP header is written.

The destination IP address in the IP header is encrypted, and therefore cannot be known on the side of the receiving device unless it is decoded. However, as the same destination IP address exists in the MAC header 70, the receiving side can find whether the data block is directed to the user or not, simply by reading the destination IP address in the MAC header 70 in a hardware manner.

In the UDB1, a PBL (Padding_Byte_Length) of 3 bits, a CP (Control_Packet) of 1 bit, an EN (Encrypted_or_Not) of 1 bit, a PN (Protocol_Type Available_or_Not) of 1 bit, a Reserve of 2 bits, and a protocol number (Protocol Type) of 16 bits are set.

The PBL is the padding byte length and expresses the length of invalid data padded in encryption. The PBL is necessary so that the user receiving the encrypted IP packet can know the normal data length.

The CP is a bit for identifying whether data required by the user or control data necessary for system operation exists in the IP packet or not. Normally, the CP of a MAC frame 63 to be received when the user makes a request indicates that not control data but data exists.

The EN is a control bit indicating whether or not the IP packet is encrypted by an encryptor. In accordance with this bit information, the user determines whether to decode the received MAC frame 63 or not. The PN is a control bit indicating whether or not useful information exists in the protocol type area. The control bits are appended to the IP packet 62.

In the UDB2, a contents ID expressing the type of information of the IP packet may also be set in addition to the destination IP address. The contents ID will be described later. The SSID identifies whether the destination IP address or the contents ID is set in the UDB2.

A CRC (Cyclic Redundancy Checking) is appended to the MAC frame 63. By thus carrying out calculation of the CRC on the data transmitting side, the data receiving side can check whether the received MAC frame is correctly transmitted or not. The generated CRC of 16 bits is appended to the last portion of the MAC frame 63.

The MAC frame 63 is converted to a section prescribed by the MPEG2, for example. The MAC frame 63 is appended immediately after a section (Sec) header 71, thus forming a section referred to as a private section 64.

The private section 64 to be transmitted is divided into transport packets $65_1, 65_2, \ldots 65_n$.

Figure 5:
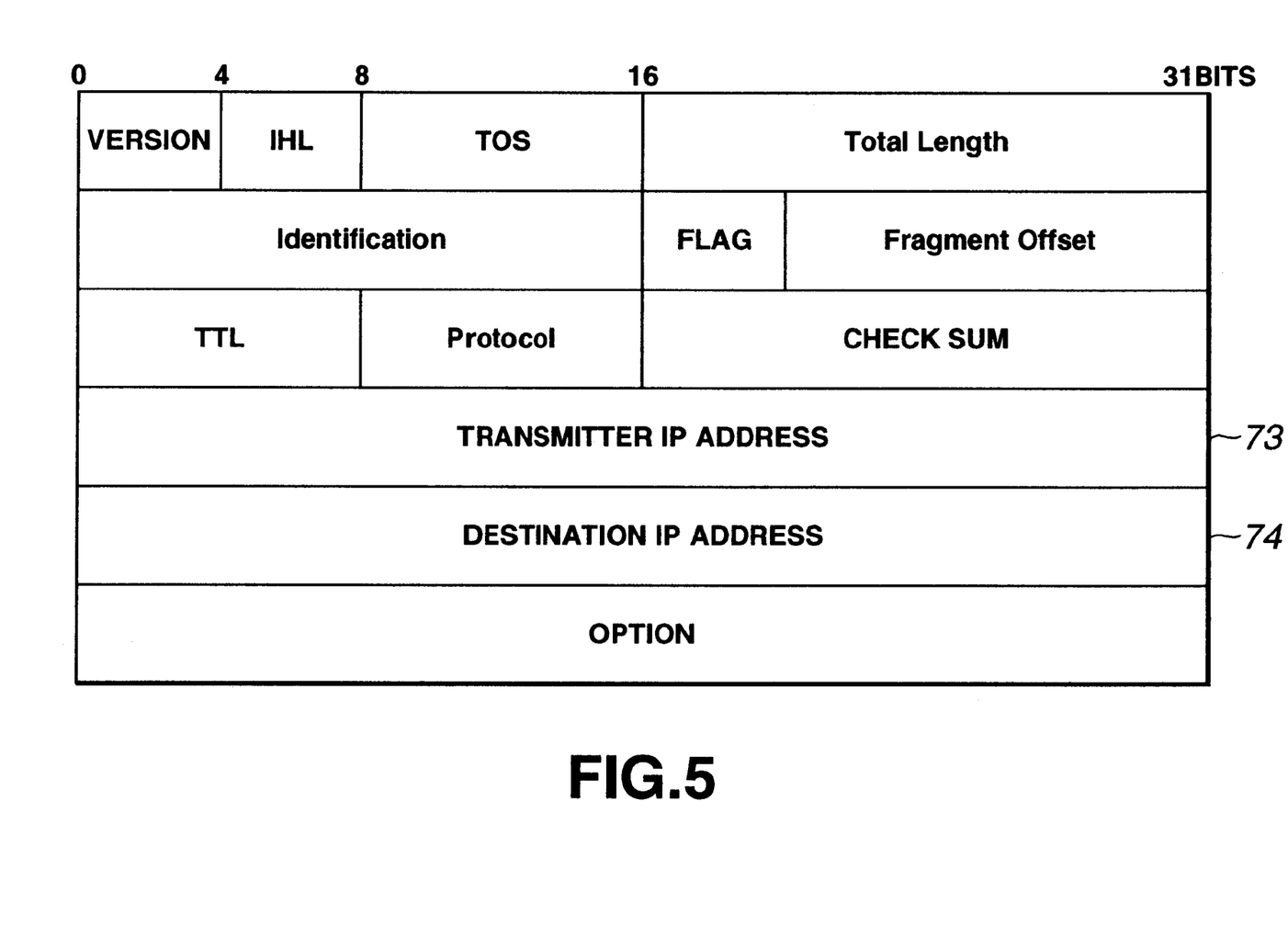
FIG. 5 is a view showing the detailed structure of an IP header.

FIG. 5 shows the IP header of the IP packet 60 used in this case. In this IP header, a destination IP address 74 of the user and a transmitter IP address 73 are set. The destination IP address 74 has 32 bits.

The data receiving device as the embodiment of the present invention will now be described further in detail.

Figure 6:
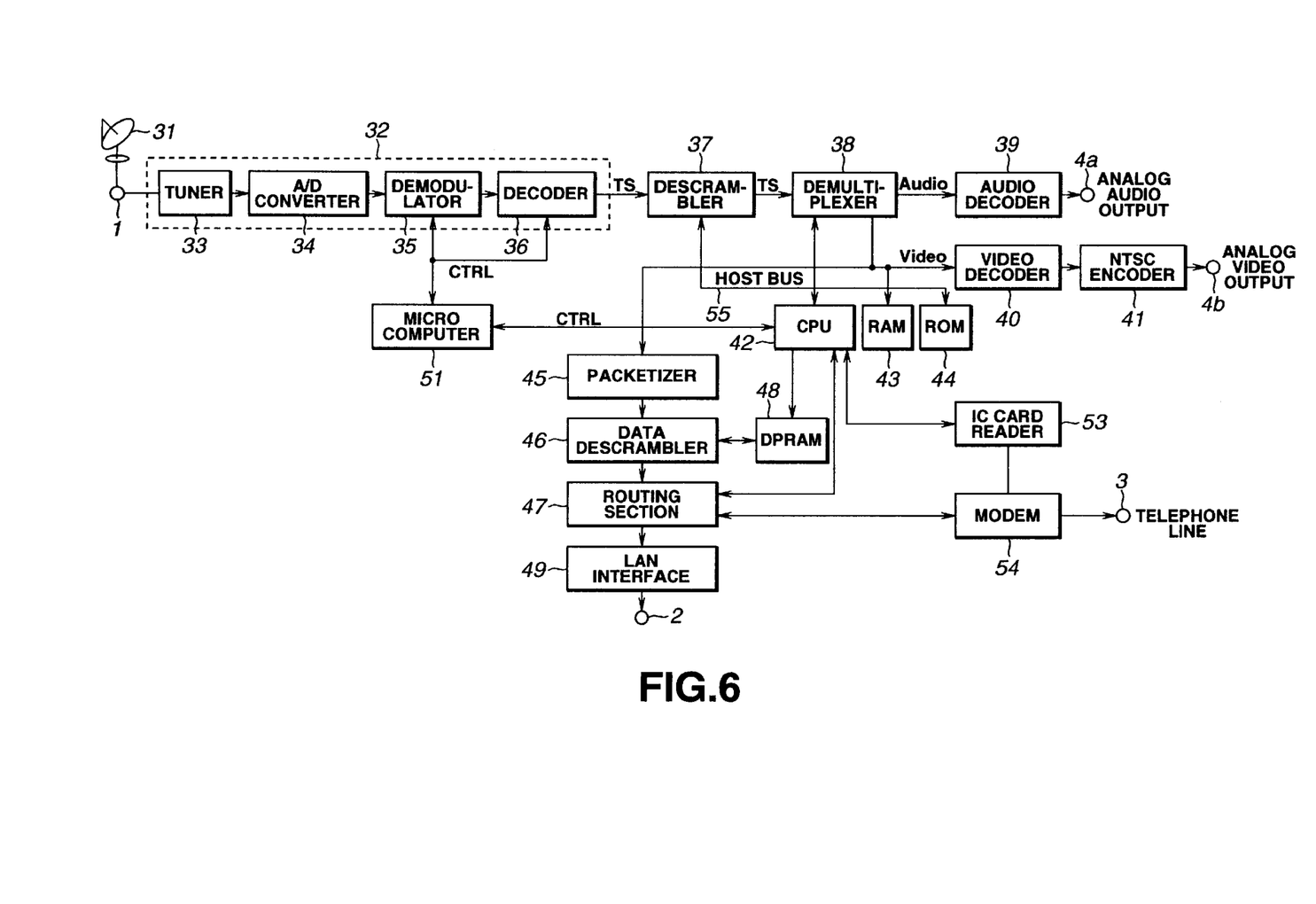
FIG. 6 is a block diagram showing a specific example of the structure of the data receiving device according to the present invention.

FIG. 6 is a block diagram showing a specific example of the structure of the data receiving device according to the present invention.

Data transmitted through the broadcast network in response to a request from a specified user is received at a receiving antenna 31 on the user side and transferred to the data receiving device of the specified user.

A signal received at the receiving antenna 31 is converted to an IF signal and inputted to a data receiving device 32 from a terminal 1. In the data receiving device 32, the signal is converted to a digital signal through a tuner 33, an A/D converter 34, a demodulator 35 and a decoder 36. The operation of the demodulator 35 and the decoder 36 is controlled by a micro computer 51 under the command of a CPU 42.

Then, encrypted TS packet data processed by demodulation and error correction is transmitted to a descrambler 37.

The descrambler 37 carried out descrambling on a TS packet level with respect to the encrypted TS packet data. In this case, the descrambler 37 reads the value of a PID portion and a scramble control portion from the header portion of the encrypted TS packet data, and judges whether or not a TS packet decoding key corresponding to this value is provided by the service provider. If the decoding key is provided, the descrambler 37 decodes a payload portion of the encrypted TS packet by using the decoding key, and outputs the decoded TS packet. If the decoding key is not provided, the descrambler 37 cancels the encrypted TS packet.

The decoded TS packet is supplied to a demultiplexer 38. The demultiplexer 38 divides audio data and video data multiplexed together with the TS packet data. Then, the demultiplexer 38 supplies the audio data to an audio decoder 39 and supplies the video data to a video decoder 40. The audio decoder 39 outputs an analog audio signal from an audio output terminal 4a, and the video decoder 40 outputs an analog video signal from a video output terminal 4b via an NTSC encoder 41. The remaining TS packet data is supplied to a packetizer 45.

The packetizer 45 is adapted for reconstructing the TS packet from the demultiplexer 38 into an IP (Internet Protocol) packet. The IP packet (IP data gram) reconstructed by the packetizer 45 is transmitted to a routing section 47 via a data descrambler 46. The data descrambler 46 is adapted for carrying out descrambling in the case where the IP data gram is scrambled. The decoding key in this operation is housed within a dual port RAM (DPRAM) 48, corresponding to an identifier.

The routing section 47 is means for selecting whether to output the IP data gram to a computer through a LAN interface 49 or to transmit the IP data gram to an external network connected to a telephone network through a modem 54. This operation is controlled by the CPU 42 as control means.

The CPU 42 is control means for controlling the operation of this data receiving device. Specifically, the CPU 42 controls reading of the DPRAM 48 and setting of the value of a reference table. The CPU 42 also controls the demultiplexer 38 and the DPRAM 48 in accordance with a program read into a RAM 43 from a ROM 44. The CPU 42 also controls transmission of the request to the external network through the modem 54 and the telephone network. These control operations are carried out through a host bus 55.

In addition, the CPU 42 may process data read from an IC card reader 53 so as to generate the decoding key or accounting information, if necessary.

Finally, the shape of the data receiving device of the present invention will be described.

This data receiving device is housed in the box-like casing, as described above, and has the broadcast interface for connection to the broadcast network, the computer interface for connection to the LAN, and the external connection interface for connection to the telephone network, on the back side thereof. The data receiving device also has a broadcast receiving function similar to that of a generally commercialized broadcast transmitting/receiving device.

Figure 7:
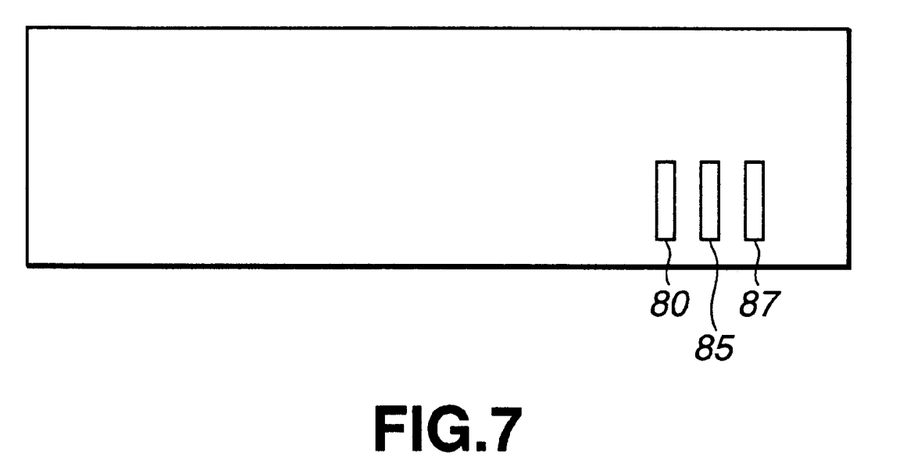
FIG. 7 is a view showing an example of the structure of a front panel of the data receiving device according to the present invention.

FIG. 7 shows an example of the structure of front panel of the data receiving device.

On the front panel, indicators for indicating operating states are provided. In this example, a power indicator 80 for indicating the on-off state of a power source, a link indicator 85 for indicating the link state, and a collision indicator 87 for indicating that collision of data is detected are provided.

Figure 8:
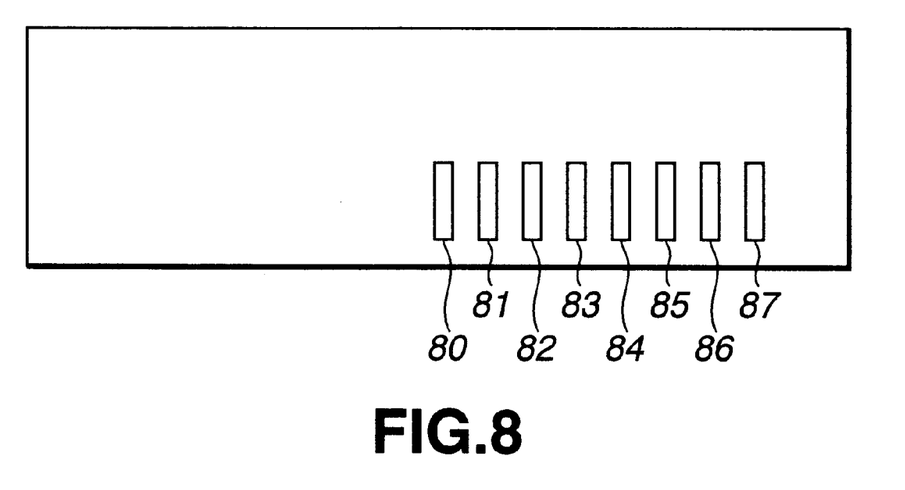
FIG. 8 is a view showing another example of the structure of the front panel of the data receiving device according to the present invention.

FIG. 8 shows another example of the structure of the front panel of the data receiving device.

In this example, a B1 indicator 81, a B2 indicator 82, a Tx (transmission) indicator 83, an Rx (receiving) indicator 84, and an analog indicator 86 are provided in addition to the indicators shown in FIG. 7.

Figure 9:
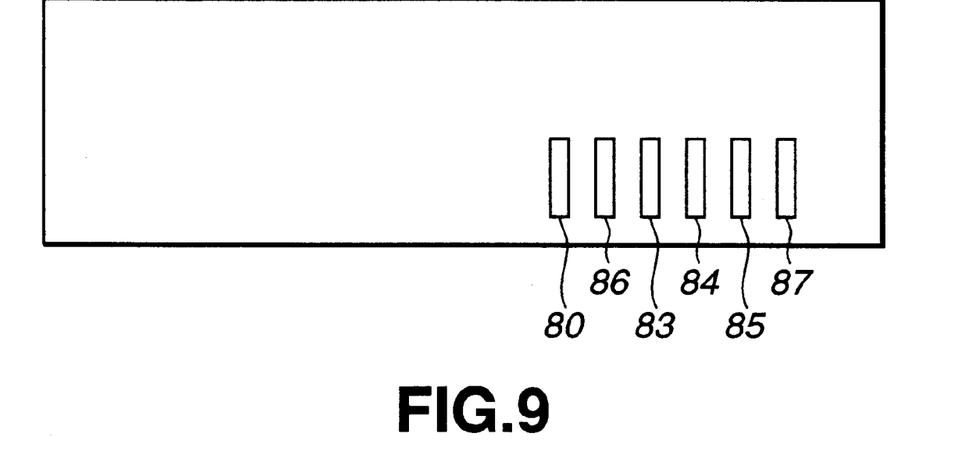
FIG. 9 is a view showing still another example of the structure of the front panel of the data receiving device according to the present invention.

FIG. 9 shows still another example of the structure of the front panel of the data receiving device. In this example, the power indicator 80, the Tx indicator 83, the Rx indicator 84, the link indicator 85, the analog indicator 86, and the collision indicator 87 are provided.

Figure 10:
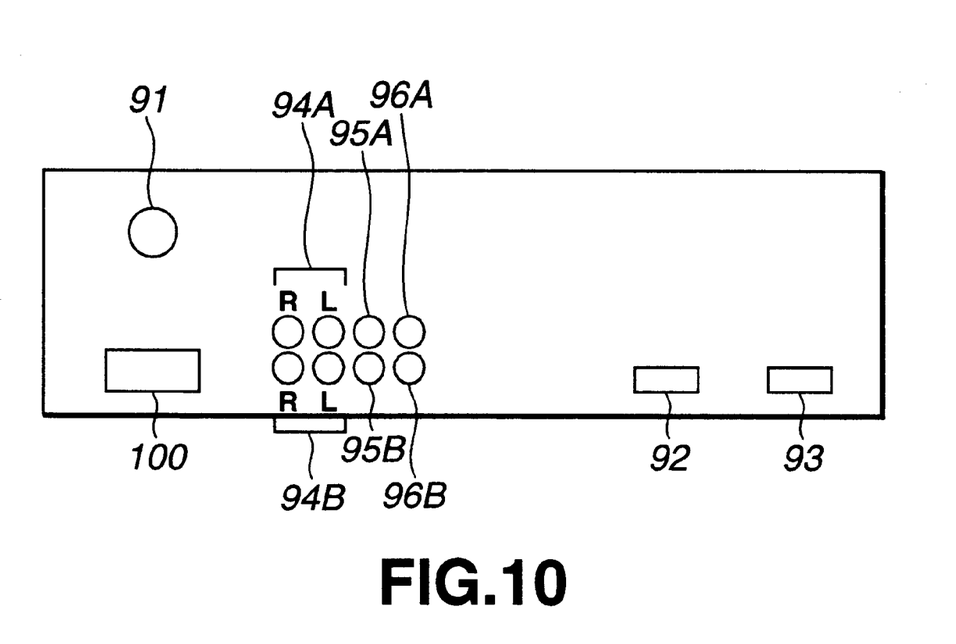
FIG. 10 is a view showing an example of the structure of a back panel of the data receiving device according to the present invention.

FIG. 10 shows an example of the structure of a back panel of the data receiving device.

On the back panel, a tuner interface (tuner I/F) connector 91 for connecting the broadcast network and the tuner, a network interface (network I/F) connector 92 for connecting the computer through the LAN or the like, and a telephone interface (telephone I/F) connector 93 for connection to the telephone network through a modem are provided. These connectors 91, 92, 93 correspond to the terminals 1, 2, 3, respectively.

In addition, audio R/L output connectors 94A, 94B for outputting analog audio signals, video output connectors 95A, 95B for outputting analog video signals, and S video output connectors 96A, 96B for outputting S video signals are provided. A power connector 100 is adapted for supplying power to this data receiving device.

According to the present invention, data transmitted through a broadcast network is received and converted to an IP packet which can be uniformly processed on a personal computer, and the IP packet is outputted. Therefore, the data transmitted through the broadcast network may be utilized on the computer in response to a request from a personal computer of each user through a telephone network. Also, since an IP address allocated on the Internet and an IP address allocated on the broadcast network are automatically converted, the user can access the Internet without being aware of the difference between these IP addresses.

In addition, means for realizing the above-mentioned functions is compactly housed in a single casing, and all the necessary interfaces are provided. Therefore, a data receiving device having high versatility may be provided without being affected by limitations such as the type of computer. By using this data receiving device, a unidirectional circuit of large capacity such as a digital satellite broadcast network may be easily used in down-loading a large volume of data at a high speed from an external network such as the Internet.

What is claimed is:

1. Data receiving apparatus for receiving data from a broadcast network and outputting the received data to a computer coupled to said data receiving apparatus through a local area network (LAN), said apparatus comprising:

routing means for routing, through the Internet via a telephone network, a request from the computer to a server on the Internet, said server being associated with the broadcast network;

receiving means for receiving response data through the broadcast network in response to the request, said response data including a destination address in a header portion thereof, said destination address having been allocated on the broadcast network;

packetizing means for packetizing the received response data into packets in accordance with the Internet Protocol;

LAN interface means to interface said data receiving apparatus with said local area network; and rewriting means for rewriting header information of the response data, including rewriting said destination address to an Internet Protocol address, allocated on the Internet, of the computer that made the request;

wherein said routing means routes the packets of the received response data with the rewritten header information through the local area network to the computer that made the request.

2. The data receiving apparatus of claim 1 wherein said response data is data transmitted by the server and passed through the broadcast network.

3. The data receiving apparatus of claim 1 wherein said receiving means further receives broadcast audio/video (A/V) data from the broadcast network, and said apparatus further comprising:

demultiplexing means for demultiplexing the received broadcast A/V data and response data; and decoding means for decoding the demultiplexed A/V data to generate an A/V output signal;

whereby said packetizing means packetizes the demultiplexed response data without packetizing the A/V data.

4. The data receiving apparatus of claim 1, further comprising an interface based on the IEEE 1394 standard for a High Performance Serial bus, wherein said routing means routes the packets of the received response data with the rewritten header information to the computer via an IEEE 1394 bus through said interface.

5. The data receiving apparatus of claim 1, further comprising:

accounting control means for controlling accounting in receiving a chargeable broadcast program.

6. The data receiving apparatus of claim 5, further comprising:

integrated circuit card reading means for reading a memory card;

wherein said accounting control means is adapted to transmit accounting information generated in accordance with conditions recorded on the memory card to a broadcasting service provider through the telephone network.

7. The data receiving apparatus of claim 1, further comprising a collision indicator for indicating that a collision of data is detected.

* * * * *